United States Patent
Noguez et al.

(10) Patent No.: US 10,882,391 B2
(45) Date of Patent: Jan. 5, 2021

(54) CONDENSER, RADIATOR AND FAN MODULE UPPER BRACKET ASSEMBLY WITH UNIVERSAL CARRIER AND OVER-MOLDED AND/OR PRESS FIT ELASTOMERIC ISOLATOR

(71) Applicants: Miguel Angel Noguez, Troy, MI (US); Frank Arthur Demers, St. Clair Shores, MI (US)

(72) Inventors: Miguel Angel Noguez, Troy, MI (US); Frank Arthur Demers, St. Clair Shores, MI (US)

(73) Assignee: ANHUI ZHONGDING RUBBER-PLASTIC PRODUCTS, CO. LTD., Ningguo (CN)

( * ) Notice: Subject to any disclaimer, the term of this patent is extended or adjusted under 35 U.S.C. 154(b) by 151 days.

(21) Appl. No.: 16/113,522

(22) Filed: Aug. 27, 2018

(65) Prior Publication Data
US 2019/0061512 A1    Feb. 28, 2019

Related U.S. Application Data

(60) Provisional application No. 62/550,146, filed on Aug. 25, 2017.

(51) Int. Cl.
| | |
|---|---|
| *B60K 11/04* | (2006.01) |
| *F16F 15/00* | (2006.01) |
| *B62D 65/02* | (2006.01) |
| *F16F 1/373* | (2006.01) |
| *F16F 15/08* | (2006.01) |

(52) U.S. Cl.
CPC .............. *B60K 11/04* (2013.01); *B62D 65/02* (2013.01); *F16F 1/3732* (2013.01); *F16F 15/08* (2013.01); *F16F 2226/04* (2013.01); *F16F 2226/042* (2013.01); *F16F 2226/045* (2013.01)

(58) Field of Classification Search
CPC ....... B60K 11/04; B62D 65/02; F16F 1/3732; F16F 15/08; F16F 2226/04; F16F 2226/042; F16F 2226/045; F16F 15/00
USPC ................... 248/634, 636, 638, 562, 560
See application file for complete search history.

(56) References Cited

U.S. PATENT DOCUMENTS

| | | | | |
|---|---|---|---|---|
| 4,519,467 A | * | 5/1985 | Saunders | B60K 11/04 165/41 |
| 4,858,866 A | * | 8/1989 | Werner | B60K 11/04 248/213.3 |
| 5,040,764 A | * | 8/1991 | Dubois | F16F 3/0873 248/603 |

(Continued)

*Primary Examiner* — Nkeisha Smith
(74) *Attorney, Agent, or Firm* — Dunlap Bennett & Ludwig, PLLC

(57) ABSTRACT

A modular CRFM upper bracket assembly providing a universal carrier operatively associating an isolator to a bracket. The isolator may be over-molded with the universal carrier or press-fit thereto. The bracket provides a carrier opening with interior threading, while universal carrier provides exterior threading dimensioned and adapted to engage the interior threading, whereby the elevation of the universal carrier, and thus isolator, relative to the bracket is adjustable through selective engagement of the threading. Thereby, the gap between the top of a vibratory object to be isolated and the bottom of isolator is also adjustable, which is advantageous for accommodating different frame tolerance variations and meeting system vibrational requirements.

5 Claims, 4 Drawing Sheets

(56) References Cited

U.S. PATENT DOCUMENTS

| | | | | |
|---|---|---|---|---|
| 5,078,224 A * | 1/1992 | Attinger | ............... | B60K 11/04 165/67 |
| 5,374,038 A * | 12/1994 | Hein | ............... | F16F 1/387 267/140.5 |
| 5,911,936 A * | 6/1999 | Hanazaki | ............... | B29C 45/14065 248/634 |
| 6,668,956 B1 * | 12/2003 | Pelage | ............... | B60K 11/04 180/312 |
| 8,051,933 B2 * | 11/2011 | Hwang | ............... | B60K 11/04 180/68.4 |
| 8,186,746 B2 * | 5/2012 | Mackenzie | ............... | B60R 19/40 296/180.5 |
| 8,777,537 B2 * | 7/2014 | Fritsch | ............... | F16B 5/02 411/338 |
| 9,238,403 B2 * | 1/2016 | Kim | ............... | B60K 11/04 |
| 9,694,666 B2 * | 7/2017 | Bruemmer | ............... | B60K 11/04 |
| 10,364,783 B2 * | 7/2019 | Hwang | ............... | F16F 15/08 |
| 2015/0291225 A1 * | 10/2015 | Yao | ............... | B62D 27/065 296/203.01 |
| 2019/0299771 A1 * | 10/2019 | Alegria Azkaiturrieta | ............... | F28F 9/002 |

\* cited by examiner

US 10,882,391 B2

CONDENSER, RADIATOR AND FAN MODULE UPPER BRACKET ASSEMBLY WITH UNIVERSAL CARRIER AND OVER-MOLDED AND/OR PRESS FIT ELASTOMERIC ISOLATOR

CROSS-REFERENCE TO RELATED APPLICATION

This application claims the benefit of priority of U.S. provisional application No. 62/550,146 filed 25 Aug. 2017, the contents of which are herein incorporated by reference.

BACKGROUND OF THE INVENTION

The present invention relates to upper bracketing system for securing a condenser, radiator and fan module (CRFM) within an automotive vehicle and, more particularly, a modular CRFM upper bracket assembly providing a universal carrier having either an over-molded or a press fit elastomeric isolator that is selectively engaged with a bracket portion for operatively associating the upper bracket system to the CRFM.

In the automotive arts, the CRFM is attached to a mating tie bar via upper brackets. However, prior to validation, such upper brackets need to go through extensive and costly vibration testing and have to be of a specific design to match each variant of the CRFM and the mating tie bar. This requires launching costly prototype tools and associated lengthy lead times because every CRFM requires a specific design of the upper brackets to fit in the required space in the vehicle. This necessitates prototype tools to validate required performance in production intent tools.

In other words, upper bracket assemblies need to be changed to fit when associated any new program tie bar to the CRFM, and the bracket of such an assembly design needs to go through several iterations before a robust design is created which can meet the vibration test requirements.

As can be seen, there is a need for a modular CRFM bracket assembly providing a universal carrier having either an over-molded or a press fit elastomeric isolator, wherein the bracket assembly is adapted to be fully characterized prior to installation to meet performance criteria and fit any type of metal or plastic bracket, whereby launching costly prototype tools may be eliminated and lead times reduced significantly, while meeting vibration profile and providing better dampening and load isolation and resistance during vibration test.

This modular approach embodied in the present invention enables user to selectively adjust the gap between top of radiator tank and bottom of elastomeric isolator to meet the tolerance variation of the mating components. This gap can be critical in the overall system, CRFM, lower isolators and upper brackets robustness during vibration testing. The universal carrier can become a common component for each subsequent program, since it will fit in any bracket design.

SUMMARY OF THE INVENTION

In one aspect of the present invention, a CRFM bracket assembly includes an annular carrier providing exterior threading; an isolator coupled to the carrier; and the isolator dimensioned and adapted to isolate a vibratory object.

In another aspect of the present invention, the CRFM bracket assembly includes an annular carrier providing exterior threading; an isolator coupled to the carrier through over-molding or press fit; the isolator dimensioned and adapted to isolate a vibratory object; a bracket having a carrier opening providing interior threading to selectively engage the exterior treading for operatively associating the isolator with a vibratory object.

In yet another aspect of the present invention, a method for operatively associating an isolator to a vehicular radiator, includes the steps of: providing the above-mentioned CRFM bracket assembly; attaching the bracket to a vehicular structure adjacent to the vehicular radiator so that the carrier opening is upward of the vehicular radiator; selectively engaging the exterior threading to the interior threading so that an elevation of the isolator relative to an elevation of the bracket is adjustable to operatively associate the isolator to the vehicular radiator.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a modular CRFM bracket assembly providing a universal carrier enabled to be selectively engaged with any upper bracket for operatively associating the isolator with the vibratory object, such as a radiator/CRFM. The isolator may be over-molded with the universal carrier. Or the isolator may be dimensioned and adapted to be a press fit into the universal carrier. The universal carrier, in turn, is dimension and adapted to operatively associate the isolator and the upper bracket. The bracket provides a carrier opening with interior threading. The universal carrier provides exterior threading dimensioned and adapted to engage the interior threading, whereby the elevation of the universal carrier, and thus isolator, relative to the bracket is adjustable through engagement of the threading. Thereby, the gap between the top of a vibratory object to be isolated (e.g., radiator, CRFM, etc.) and the bottom of isolator is also adjustable, which is advantageous for accommodating different frame tolerance variations and meeting system vibrational requirements.

Figure 1:
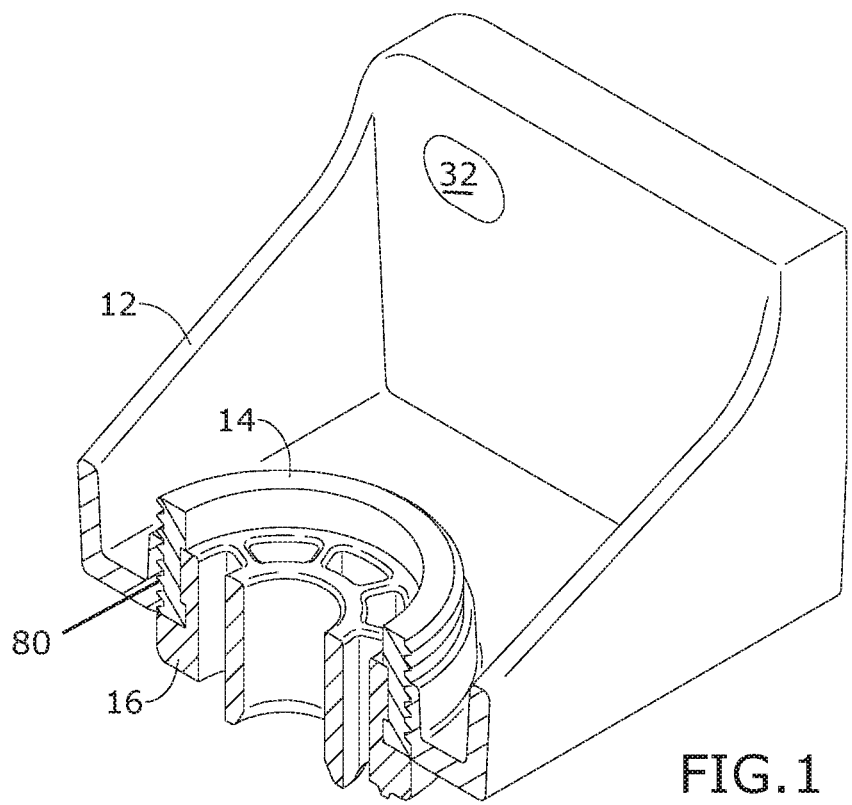
FIG. 1 is a perspective sectional view of an exemplary embodiment of the present invention.
Figure 2:
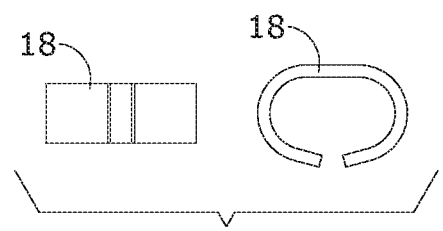
FIG. 2 shows a front and side elevation views of a limiter 18 of an exemplary embodiment of the present invention.
Figure 4:
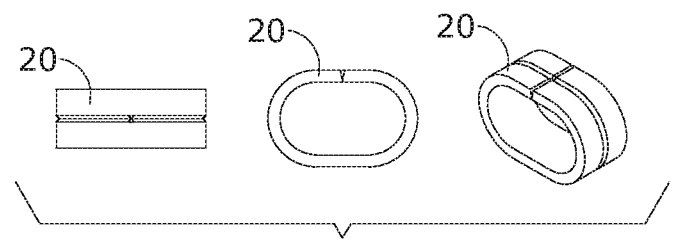
FIG. 4 is a detail perspective view of a bracket 12 of an exemplary embodiment of the present invention.
Figure 3:
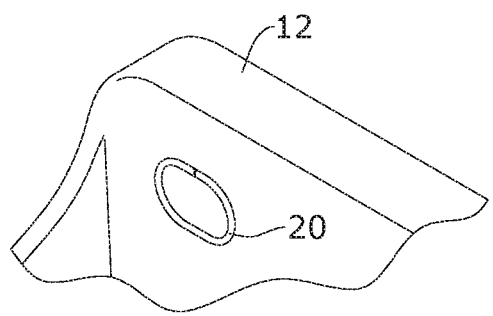
FIG. 3 shows a front elevation, side elevation and perspective views of a compression limiter 20 of an exemplary embodiment of the present invention.
Figure 5A:
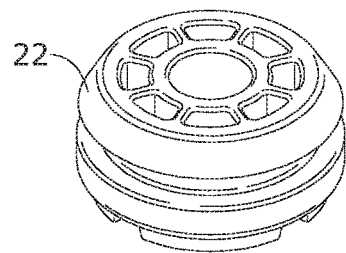
FIG. 5A is a perspective view of an isolator 22 of an exemplary embodiment of the present invention.
Figure 5B:
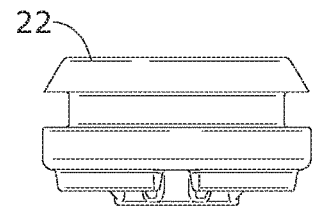
FIG. 5B is a front view of an isolator 22 of an exemplary embodiment of the present invention.
Figure 6A:
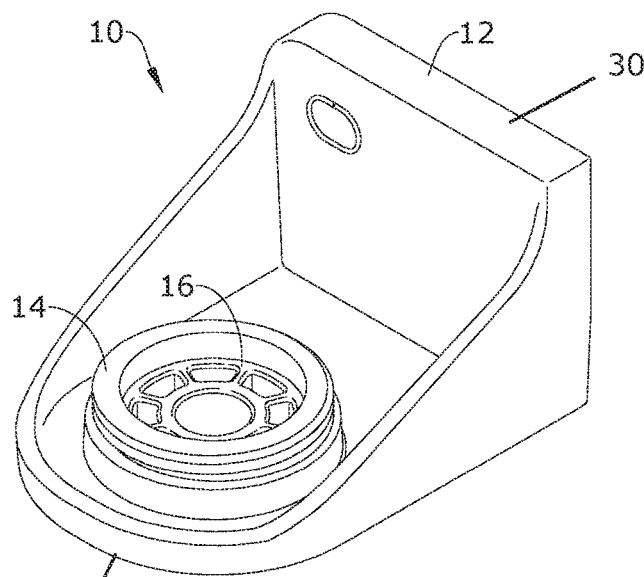
FIG. 6A is a perspective view of an exemplary embodiment of the present invention.
Figure 6B:
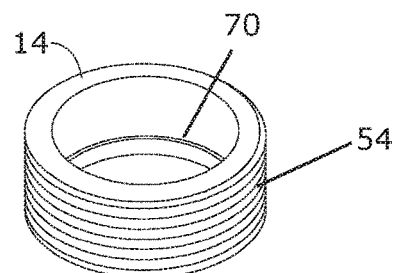
FIG. 6B is an exploded view of an exemplary embodiment of the present invention.
Figure 6B:
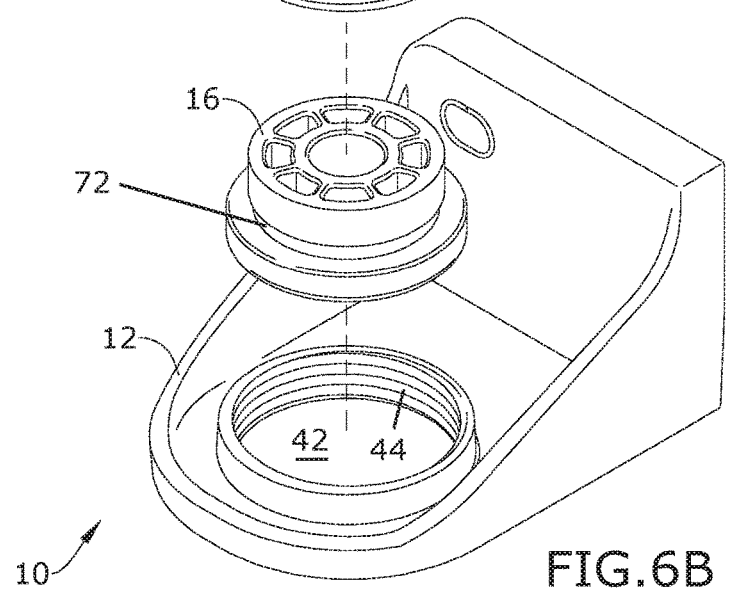
Figure 7A:
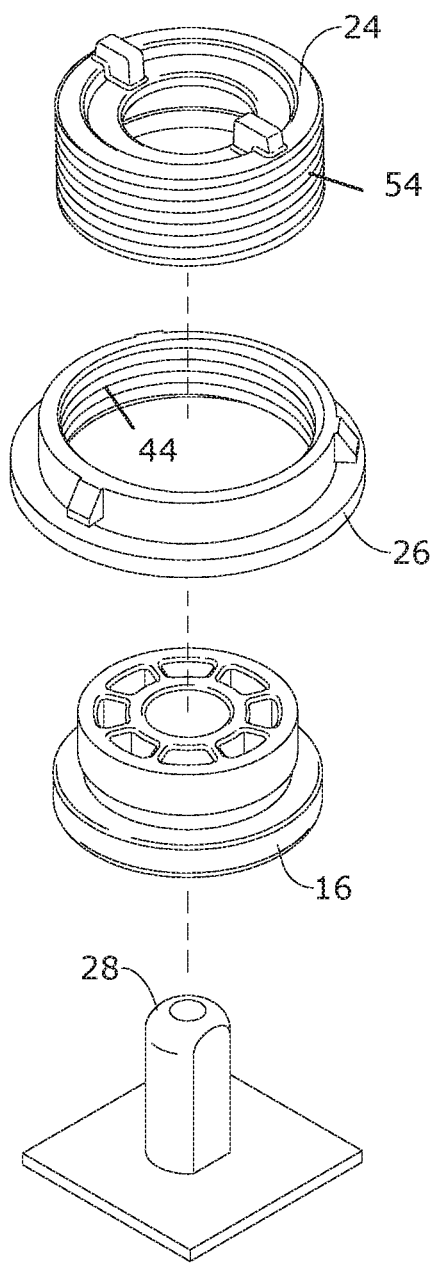
FIG. 7A is a perspective view of an exemplary embodiment of the present invention.
Figure 7B:
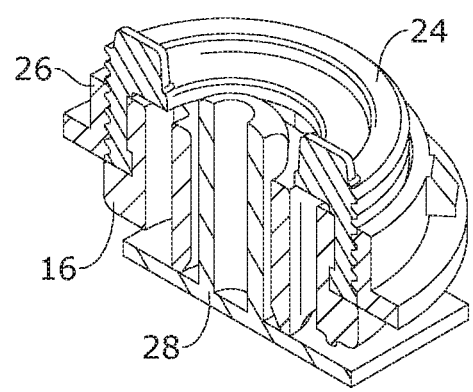
FIG. 7B is an exploded view of an exemplary embodiment of the present invention.
Figure 8:
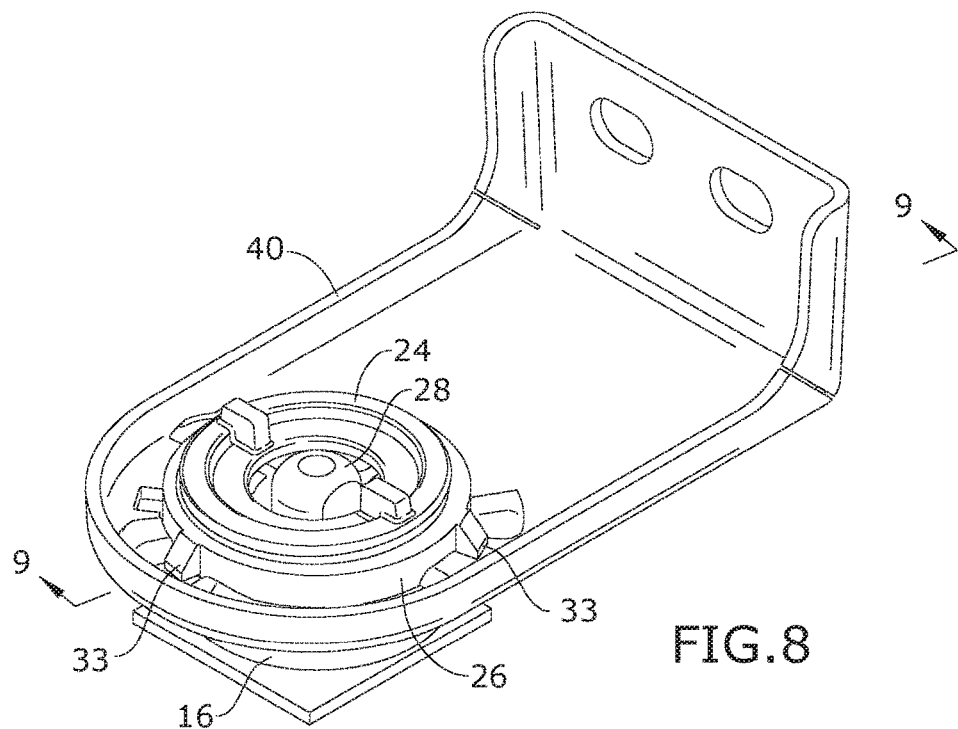
FIG. 8 is a perspective view of an exemplary embodiment of the present invention.
Figure 9:
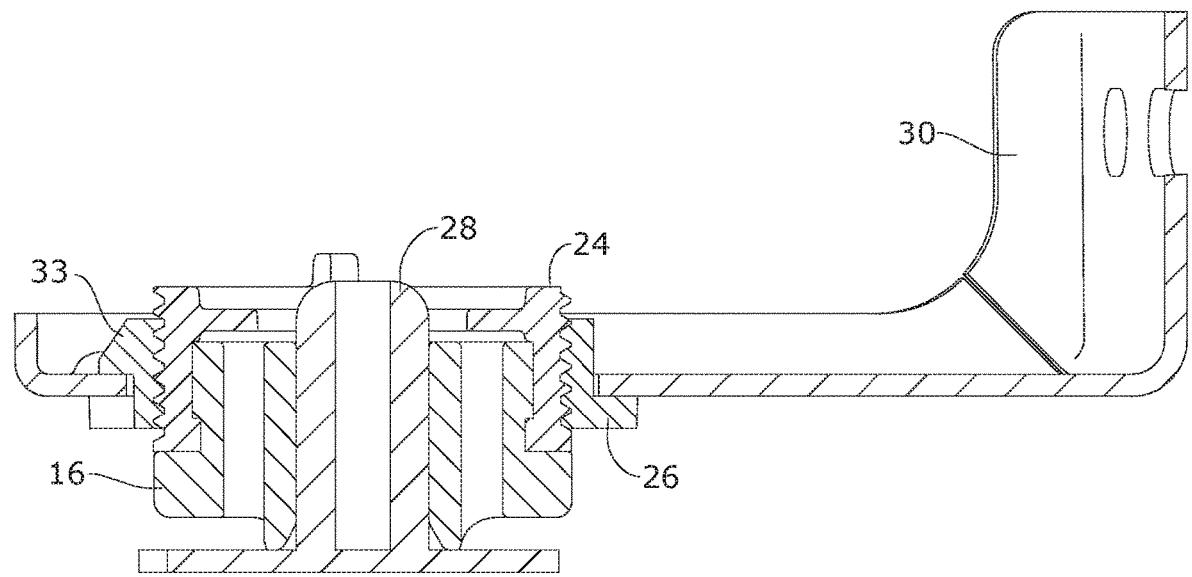
FIG. 9 is a perspective section view of an exemplary embodiment of the present invention, taken along line 9-9 in FIG. 8.

Referring now to FIGS. 1 through 9, the present invention may include a CRFM bracket assembly 10, a universal carrier 14 or 24, and an elastomeric isolator element 16 or 22. The CRFM bracket assembly 10 contemplates selectively engaging a bracket 12 that may be made out of various polymeric materials, metallic material, or a composite thereof. The bracket 12 may have a first portion 30 and a second portion 40, which may be generally perpendicularly extending therefrom. The first portion 30 may provide a borehole 32 for attaching the bracket 12 and thus the assembly 10 to the structure of a vehicle (not shown). Within the borehole 32 may be provided a press-fit torque limiter 18 or a molded-in torque limiter 20, each adapted to eliminate any creep concerns.

The bracket 12 may provide a carrier opening 42 having interior threads 44 enabling the universal carrier 14 or 24 to be selectively fastened at a required depth. The over-molded isolator 16 or 22 may be bonded to the universal carrier 14 or 24. Alternatively, the elastomeric isolator 16 or 22 may be press fitted to the universal carrier 14 or 24. The press fit elastomeric isolator 16 or 22 may provide a flanged recess 72 dimensioned and adapted to removably engage a carrier flanged recess 70 through a press-fit, snap on connection.

Referring to FIGS. 7A through 9, in some embodiments the carrier opening 42 provides snap fit features (not visible) instead of interior threading 44. The present invention contemplates this situation by providing a snap fit carrier ring 26 with complementary snap fit features for engagement of the carrier opening. The carrier ring 26 provides the aforementioned interior threading 44. The carrier ring 26 may also provide protrusions 33 for facilitating the snap fit functionality.

A method of making the present invention may include the following. The bracket 12 and carrier ring 26 may be injection molded using the OEM approved Long Fiber Reinforced Thermoplastic (LFRT) so as to provide at least one borehole 32 on the first portion 30 and an interior threaded carrier opening 42 on the second portion 32.

The universal carrier 14 may also be manufactured using OEM approved LFRT so as to have cooperating molded-in exterior threads 54 to selectively engage said interior threaded carrier opening 42. The torque limiters 18 or 20 may be injection molded-in into the fastening borehole 32.

The elastomeric isolators 16 and 22 may be chemically bonded (over-molded) or mechanically interlocked (press-fit) to the composite universal carrier 14 or 24. The composite universal carrier 14 or 24, the elastomeric isolator 16 or 22, and the composite brackets 12 with molded-in torque limiters 18 may complete the CRFM upper bracket assembly 10.

As mentioned above, press fit elastomeric isolators 16 and 22 could be used instead of over-molded ones for potential better isolation. Either over-molded or press fit elastomeric isolators 16 and 22 could be used with the composite universal carrier 14 or 24 with the selected durometer (e.g., shore A hardness) based on expected isolation performance of the CRFM upper bracket assembly 10.

A method of using the present invention may include the following. The CRFM bracket assembly 10 disclosed above may be provided. A user may assemble the CRFM bracket assembly 10, which includes attaching the bracket 12 to a structure, such as a tie bar of the front of the vehicle, via the borehole 32 so that the carrier opening 42 of the second portion 40 is adjacent to a pin 28 of the vibratory object to be isolated (e.g., upward of a radiator end tank pin). Thereby, the CRFM bracket assembly 10 enables user to isolate yet secure the radiator to the front structure of the vehicle.

Then the user either selects the carrier 14 or 24 pre-combined with over-molded isolator 16 or 22 or the user press-fits the press-fit isolator 16 or 22 on to the carrier 14/24 via the flanged recesses 70 and 72. If the bracket's carrier opening 42 provides snap-fit features, then the user snap-fits the carrier ring thereto. With the desired carrier-isolator combination, the user selectively engages the exterior threading 54 of the carrier 14 or 24 with the interior threading 44 of the carrier opening 42 for a predetermined elevation displacement of the isolator 16 or 22 relative to the second portion 40, making the gap between the top of the vibratory object and the bottom of said isolator 16 or 22 adjustable.

The method embodied in the present invention enables control of the depth of the engagement of the isolator relative to a vehicle radiator. Thereby, the CRFM bracket assembly 10 isolates the CRFM from the vehicular body and prevents excessive vibration that could cause NVH and durability issues. The CRFM bracket assembly 10 will provide these functions for the entire life of the vehicle under typical vehicle usage including, but not limited extreme environment conditions such as temperature, humidity, water, salt spray and splash and uneven roads that may have pot holes.

In certain embodiments, an adhesive 80 may be applied to the threading engagement of the interior and exterior threading 44 and 54, cementing a predetermined depth of engagement/relative elevation of the universal carrier 14 or 24 and thus the isolator 16 or 22. The molded thread and adhesive 90 application may provide better dampening and higher resistance to high loads during vibration test. The Durometer (Shore A hardness) of the elastomeric isolator will encompass a range to fit all the needs for vibration isolation. Moreover, the universal carrier 14, 24 may be color coded to prominently designate the Durometer of the isolator.

Additionally, the present invention could be used in many other applications or assemblies where a modularity approach in meeting vibration isolation and dampening requirements is advantageous.

It should be understood, of course, that the foregoing relates to exemplary embodiments of the invention and that modifications may be made without departing from the spirit and scope of the invention as set forth in the following claims. Specifically, the shape of the bracket 12 is for illustration purposes only as each vehicle/application may require a specific shape since it will need to fit in the packaging environment and attached to a relevant tie bar.

What is claimed is:

1. A CRFM upper bracket assembly, comprising:
an annular carrier providing exterior threading;
an isolator coupled to the carrier;
the isolator dimensioned and adapted to isolate a vibratory object;
a bracket having a carrier opening providing a snap fit feature; and
a carrier ring comprising:

a cooperating snap fit feature to associate with said snap fit feature; and an interior threading dimensioned to selectively engage the exterior threading for operatively associating the isolator with a vibratory object.

2. The CRFM upper bracket assembly of claim 1, wherein the isolator is coupled to the carrier through over-molding.

3. The CRFM upper bracket assembly of claim 1, wherein the isolator is coupled to the carrier through a press-fit connection.

4. The CRFM upper bracket assembly of claim 1, further comprising a borehole provided by the bracket.

5. The CRFM upper bracket assembly of claim 4, further comprising a torque limiter associated with the borehole.

* * * * *